US011988922B2

(12) United States Patent
Lee et al.

(10) Patent No.: US 11,988,922 B2
(45) Date of Patent: May 21, 2024

(54) NANOSTRUCTURE BASED DISPLAY DEVICES WITH IMPROVED LIGHT EXTRACTION EFFICIENCY

(71) Applicant: Shoei Chemical Inc., Tokyo (JP)

(72) Inventors: Ernest C. Lee, Palo Alto, CA (US); David Olmeijer, San Francisco, CA (US); Charles Hotz, San Rafael, CA (US); Ruiqing Ma, Morristown, NJ (US); Jason Hartlove, Los Altos, CA (US)

(73) Assignee: SHOEI CHEMICAL INC., Tokyo (JP)

( * ) Notice: Subject to any disclaimer, the term of this patent is extended or adjusted under 35 U.S.C. 154(b) by 225 days.

(21) Appl. No.: 17/609,205

(22) PCT Filed: May 7, 2020

(86) PCT No.: PCT/US2020/031856
§ 371 (c)(1),
(2) Date: Nov. 5, 2021

(87) PCT Pub. No.: WO2020/227518
PCT Pub. Date: Nov. 12, 2020

(65) Prior Publication Data
US 2022/0206341 A1  Jun. 30, 2022

Related U.S. Application Data

(60) Provisional application No. 62/845,224, filed on May 8, 2019.

(51) Int. Cl.
*G02F 1/1335* (2006.01)
*G02F 1/13357* (2006.01)

(52) U.S. Cl.
CPC .. *G02F 1/133614* (2021.01); *G02F 1/133512* (2013.01); *G02F 1/133603* (2013.01); *G02F 1/133528* (2013.01); *G02F 2202/36* (2013.01)

(58) Field of Classification Search
CPC ......... G02F 1/133614; G02F 1/133617; G02F 2202/36
See application file for complete search history.

(56) References Cited

U.S. PATENT DOCUMENTS

2009/0015142 A1   1/2009  Potts et al.
2012/0013654 A1*  1/2012  Yashiro ............ G02F 1/133617
                                                    345/88
(Continued)

FOREIGN PATENT DOCUMENTS

EP           2397885 A1       12/2011
WO    WO-2013/183751 A1       12/2013

OTHER PUBLICATIONS

Notification of Transmittal of the International Search Report and Written Opinion of the International Searching Authority, PCT App. No. PCT/US2020/031856, 18 pages, dated Jul. 20, 2020.

*Primary Examiner* — Jonathan Y Jung
(74) *Attorney, Agent, or Firm* — Alleman Hall & Tuttle LLP (57) ABSTRACT

Embodiments of a display device are described. A display device includes a backlight unit having a light source and a liquid crystal display (LCD) module. The LCD module includes a nanostructure-based color conversion (NS-based CC) layer and a light extraction layer. The NS-based CC layer is configured to receive a primary light, from the light source, having a first peak wavelength and to convert a portion of the primary light to emit a first portion of a secondary light having a second peak wavelength. The second peak wavelength is different from the first peak wavelength. The light extraction layer is optically coupled to the NS-based CC layer and is configured to prevent total internal reflection of a second portion of the secondary light.

(Continued)

The light extraction layer has patterned features with one or more dimension in nanometer scale.

19 Claims, 4 Drawing Sheets

(56) References Cited

U.S. PATENT DOCUMENTS

| | | | |
|---|---|---|---|
| 2012/0120365 A1* | 5/2012 | Legerton | B29D 11/00644 |
| | | | 977/773 |
| 2018/0024404 A1 | 1/2018 | Suzuki et al. | |
| 2019/0064592 A1* | 2/2019 | Lee | G02F 1/133514 |
| 2019/0185743 A1* | 6/2019 | Kim | G02F 1/133528 |
| 2019/0219872 A1* | 7/2019 | Shi | G02B 1/005 |
| 2020/0033671 A1* | 1/2020 | Wang | G02F 1/133617 |

\* cited by examiner

NANOSTRUCTURE BASED DISPLAY DEVICES WITH IMPROVED LIGHT EXTRACTION EFFICIENCY

BACKGROUND OF THE INVENTION

Field

The present invention relates to display devices including color conversion layers having luminescent nanostructures such as quantum dots (QDs).

Background

Luminescent nanostructures (NSs) such as quantum dots (QDs) represent a class of phosphors that have the ability to emit light at a single spectral peak with narrow line width, creating highly saturated colors. It is possible to tune the emission wavelength based on the size of the NSs. The NSs are used to produce a NS film that can be used as a color conversion (CC) layer (also referred to as a color down-conversion layer) in display devices (e.g., liquid crystal display (LCD) device, organic light emitting diode (OLED) display device). The use of a NS-based CC layer in emissive displays can improve the system efficiency by down-converting white light, blue light, or ultra-violet (UV) light to a light in the red and/or green wavelength region before the light passes through a color filter. The use of a NS-based CC layer can reduce loss of light energy due to filtering.

The NS-based CC layers typically have planar top surfaces from which light is emitted. And, since these layers typically have a higher refractive index relative to the medium into which the light is emitted, a significant amount of the light generated by the NSs is reflected back into the CC layers through total internal reflection. Even though the light may escape through the planar top surfaces after multiple total internal reflections, the delay in light emission caused by the total internal reflections can result in significant optical losses in the display devices. As such, one of the challenges in producing NS-based display devices is achieving high light extraction efficiency (e.g., greater than 50%, 60%, 70%, or 80%) for high external quantum efficiency of the NS-based display devices.

SUMMARY

The present disclosure provides example highly efficient NS-based display devices with light extraction layers for enhanced light extraction from NS-based CC layers. The present disclosure also provides example inexpensive methods for fabricating the same.

In some embodiments, the light extraction layer can be configured to provide directivity to light emitted from a NS-based CC layer of the NS-based display device and substantially reduce or prevent total internal reflection of the emitted light within the NS-based CC layer, thus increasing the light extraction efficiency (e.g., greater than 50%, 60%, 70%, or 80%) of the NS-based display device. The light extraction layer can substantially reduce or prevent the total internal reflection by providing a non-uniform interface between the NS-based CC layer and a medium into which the light from the NS-based CC layer can be emitted. The non-uniform interface can be provided by nanostructured features of the light extraction layer. The nanostructured features can be transfer printed in a repeating, a non-repeating, and/or a random pattern on a substrate of the light extraction layer or on a surface of the medium into which the light from the NS-based CC layer can be emitted.

In some embodiments, the nanostructured features and/or the substrate of the light extraction layer can include a material similar to a matrix material of the NS-based CC layer to provide a better refractive index matching with the NS-based CC layer than the refractive index matching between the NS-based CC layer and the medium. The better refractive index matching can also substantially reduce or prevent total internal reflection of the emitted light within the NS-based CC layer. The present disclosure further provides various embodiments to improve display performance such as color gamut coverage of the NS-based display devices by substantially reducing or eliminating leakage of unwanted light through one or more pixels of the display devices.

According to some embodiments, a display device includes a backlight unit having a light source and a liquid crystal display (LCD) module. The LCD module includes a nanostructure-based color conversion (NS-based CC) layer and a light extraction layer. The NS-based CC layer is configured to receive a primary light, from the light source, having a first peak wavelength and to convert a portion of the primary light to emit a first portion of a secondary light having a second peak wavelength. The second peak wavelength is different from the first peak wavelength. The light extraction layer is optically coupled to the NS-based CC layer and is configured to prevent total internal reflection of a second portion of the secondary light. The light extraction layer has patterned features with one or more dimension in nanometer scale.

According to some embodiments, a method of fabricating a display device includes forming first and second parts of a liquid crystal display (LCD) module, disposing the second part of the LCD module on the first part of the LCD module, and disposing a display screen on the second part of the LCD module. The forming the first part includes disposing a liquid crystal solution layer on a back light unit (BLU) of the display device and disposing a polarizing filter on the liquid crystal solution layer. The forming the second part includes forming a light extraction layer on an optically transparent substrate and forming a nanostructure-based color conversion (NS-based CC) layer on the light extraction layer.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. Unless otherwise indicated, the drawings provided throughout the disclosure should not be interpreted as to-scale drawings.

DETAILED DESCRIPTION OF THE INVENTION

Although specific configurations and arrangements may be discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications beyond those specifically mentioned herein. It should be appreciated that the particular implementations shown and described herein are examples and are not intended to otherwise limit the scope of the application in any way.

It is noted that references in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

All numbers in this description indicating amounts, ratios of materials, physical properties of materials, and/or use are to be understood as modified by the word "about," except as otherwise explicitly indicated.

In some embodiments, the term "display device" refers to an arrangement of elements that allow for the visible representation of data on a display screen. Suitable display screens can include various flat, curved or otherwise-shaped screens, films, sheets or other structures for displaying information visually to a user. Display devices described herein can be included in, for example, display systems encompassing a liquid crystal display (LCD), televisions, computers, mobile phones, smart phones, personal digital assistants (PDAs), gaming devices, electronic reading devices, digital cameras, tablets, wearable devices, car navigation systems, and the like.

The term "about" as used herein indicates the value of a given quantity varies by ±10% of the value. For example, "about 100 nm" encompasses a range of sizes from 90 nm to 110 nm, inclusive.

The term "substantially" as used herein indicates the value of a given quantity varies by ±1% to ±5% of the value.

In some embodiments, the term "forming a reaction mixture" or "forming a mixture" refers to combining at least two components in a container under conditions suitable for the components to react with one another and form a third component.

In some embodiments, the terms "light guide plate," "light guide," and "light guide panel" are used interchangeably and refer to an optical component that is suitable for directing electromagnetic radiation (light) from one position to another.

In some embodiments, the term "optically coupled" means that components are positioned such that light is able to pass from one component to another component without substantial interference.

The term "nanostructure" as used herein refers to a structure having at least one region or characteristic dimension with a dimension of less than about 500 nm. In some embodiments, the nanostructure has a dimension of less than about 200 nm, less than about 100 nm, less than about 50 nm, less than about 20 nm, or less than about 10 nm. Typically, the region or characteristic dimension will be along the smallest axis of the structure. Examples of such structures include nanowires, nanorods, nanotubes, branched nanostructures, nanotetrapods, tripods, bipods, nanocrystals, nanodots, QDs, nanoparticles, and the like. Nanostructures can be, e.g., substantially crystalline, substantially monocrystalline, polycrystalline, amorphous, or a combination thereof. In some embodiments, each of the three dimensions of the nanostructure has a dimension of less than about 500 nm, less than about 200 nm, less than about 100 nm, less than about 50 nm, less than about 20 nm, or less than about 10 nm.

The term "QD" or "nanocrystal" as used herein refers to nanostructures that are substantially monocrystalline. A nanocrystal has at least one region or characteristic dimension with a dimension of less than about 500 nm, and down to the order of less than about 1 nm. The terms "nanocrystal," "QD," "nanodot," and "dot," are readily understood by the ordinarily skilled artisan to represent like structures and are used herein interchangeably. The present invention also encompasses the use of polycrystalline or amorphous nanocrystals.

The term "heterostructure" when used with reference to nanostructures refers to nanostructures characterized by at least two different and/or distinguishable material types. Typically, one region of the nanostructure comprises a first material type, while a second region of the nanostructure comprises a second material type. In certain embodiments, the nanostructure comprises a core of a first material and at least one shell of a second (or third etc.) material, where the different material types are distributed radially about the long axis of a nanowire, a long axis of an arm of a branched nanowire, or the center of a nanocrystal, for example. A shell can but need not completely cover the adjacent materials to be considered a shell or for the nanostructure to be considered a heterostructure; for example, a nanocrystal characterized by a core of one material covered with small islands of a second material is a heterostructure. In other embodiments, the different material types are distributed at different locations within the nanostructure; e.g., along the major (long) axis of a nanowire or along a long axis of arm of a branched nanowire. Different regions within a heterostructure can comprise entirely different materials, or the different regions can comprise a base material (e.g., silicon) having different dopants or different concentrations of the same dopant.

As used herein, the term "diameter" of a nanostructure refers to the diameter of a cross-section normal to a first axis of the nanostructure, where the first axis has the greatest difference in length with respect to the second and third axes (the second and third axes are the two axes whose lengths most nearly equal each other). The first axis is not necessarily the longest axis of the nanostructure; e.g., for a disk-shaped nanostructure, the cross-section would be a substantially circular cross-section normal to the short longitudinal axis of the disk. Where the cross-section is not circular, the diameter is the average of the major and minor axes of that cross-section. For an elongated or high aspect ratio nanostructure, such as a nanowire, the diameter is measured across a cross-section perpendicular to the longest axis of the nanowire. For a spherical nanostructure, the diameter is measured from one side to the other through the center of the sphere.

The terms "crystalline" or "substantially crystalline," when used with respect to nanostructures, refer to the fact that the nanostructures typically exhibit long-range ordering across one or more dimensions of the structure. It will be understood by one of skill in the art that the term "long range ordering" will depend on the absolute size of the specific nanostructures, as ordering for a single crystal cannot extend beyond the boundaries of the crystal. In this case, "long-range ordering" will mean substantial order across at least the majority of the dimension of the nanostructure. In some instances, a nanostructure can bear an oxide or other coating, or can be comprised of a core and at least one shell. In such instances it will be appreciated that the oxide, shell(s), or other coating can but need not exhibit such ordering (e.g. it can be amorphous, polycrystalline, or otherwise). In such instances, the phrase "crystalline," "substantially crystalline," "substantially monocrystalline," or "monocrystalline" refers to the central core of the nanostructure (excluding the coating layers or shells). The terms "crystalline" or "substantially crystalline" as used herein are intended to also encompass structures comprising various defects, stacking faults, atomic substitutions, and the like, as long as the structure exhibits substantial long range ordering (e.g., order over at least about 80% of the length of at least one axis of the nanostructure or its core). In addition, it will be appreciated that the interface between a core and the outside of a nanostructure or between a core and an adjacent shell or between a shell and a second adjacent shell can contain non-crystalline regions and can even be amorphous. This does not prevent the nanostructure from being crystalline or substantially crystalline as defined herein.

The term "monocrystalline" when used with respect to a nanostructure indicates that the nanostructure is substantially crystalline and comprises substantially a single crystal. When used with respect to a nanostructure heterostructure comprising a core and one or more shells, "monocrystalline" indicates that the core is substantially crystalline and comprises substantially a single crystal.

The term "ligand" as used herein refers to a molecule capable of interacting (whether weakly or strongly) with one or more faces of a nanostructure, e.g., through covalent, ionic, van der Waals, or other molecular interactions with the surface of the nanostructure.

The term "quantum yield" (QY) as used herein refers to the ratio of photons emitted to photons absorbed, e.g., by a nanostructure or population of nanostructures. As known in the art, quantum yield is typically determined by a comparative method using well-characterized standard samples with known quantum yield values.

The term "primary emission peak wavelength" as used herein refers to the wavelength at which the emission spectrum exhibits the highest intensity.

The term "full width at half-maximum" (FWHM) as used herein refers to refers to a measure of spectral width. In the case of an emission spectrum, a FWHM can refer to a width of the emission spectrum at half of a peak intensity value.

The term Forster radius used herein is also referred as Forster distance in the art.

The terms "luminance" and "brightness" are used herein interchangeably and refer to a photometric measure of a luminous intensity per unit area of a light source or an illuminated surface.

The terms "specular reflectors," "specularly reflective surfaces," and "reflective surfaces" are used herein to refer to elements, materials, and/or surfaces capable of specular reflection.

The term "specular reflection" is used herein to refer to a mirror-like reflection of light (or of other kinds of wave) from a surface, when an incident light hits the surface.

The term "nanostructure (NS) film" is used herein to refer to a film having luminescent nanostructures.

The term "red sub-pixel" is used herein to refer to an area of a pixel that emits light having a primary emission peak wavelength in the red wavelength region of the visible spectrum. In some embodiments, the red wavelength region can include wavelengths ranging from about 620 nm to about 750 nm.

The term "green sub-pixel" is used herein to refer to an area of a pixel that emits light having a primary emission peak wavelength in the green wavelength region of the visible spectrum. In some embodiments, the green wavelength region can include wavelengths ranging from about 495 nm to about 570 nm.

The term "blue sub-pixel" is used herein to refer to an area of a pixel that emits light having a primary emission peak wavelength in the blue wavelength region of the visible spectrum. In some embodiments, the blue wavelength region can include wavelengths ranging from about 435 nm to about 495 nm.

The term "emissive surface of a sub-pixel" is used herein to refer to a surface of a topmost layer of the sub-pixel from which light is emitted towards a display screen of a display device.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

Technical and scientific terms used herein have the meaning commonly understood by one of skill in the art to which the present application pertains, unless otherwise defined. Reference is made herein to various methodologies and materials known to those of skill in the art.

Example Embodiments of a Display Device

Figure 1:
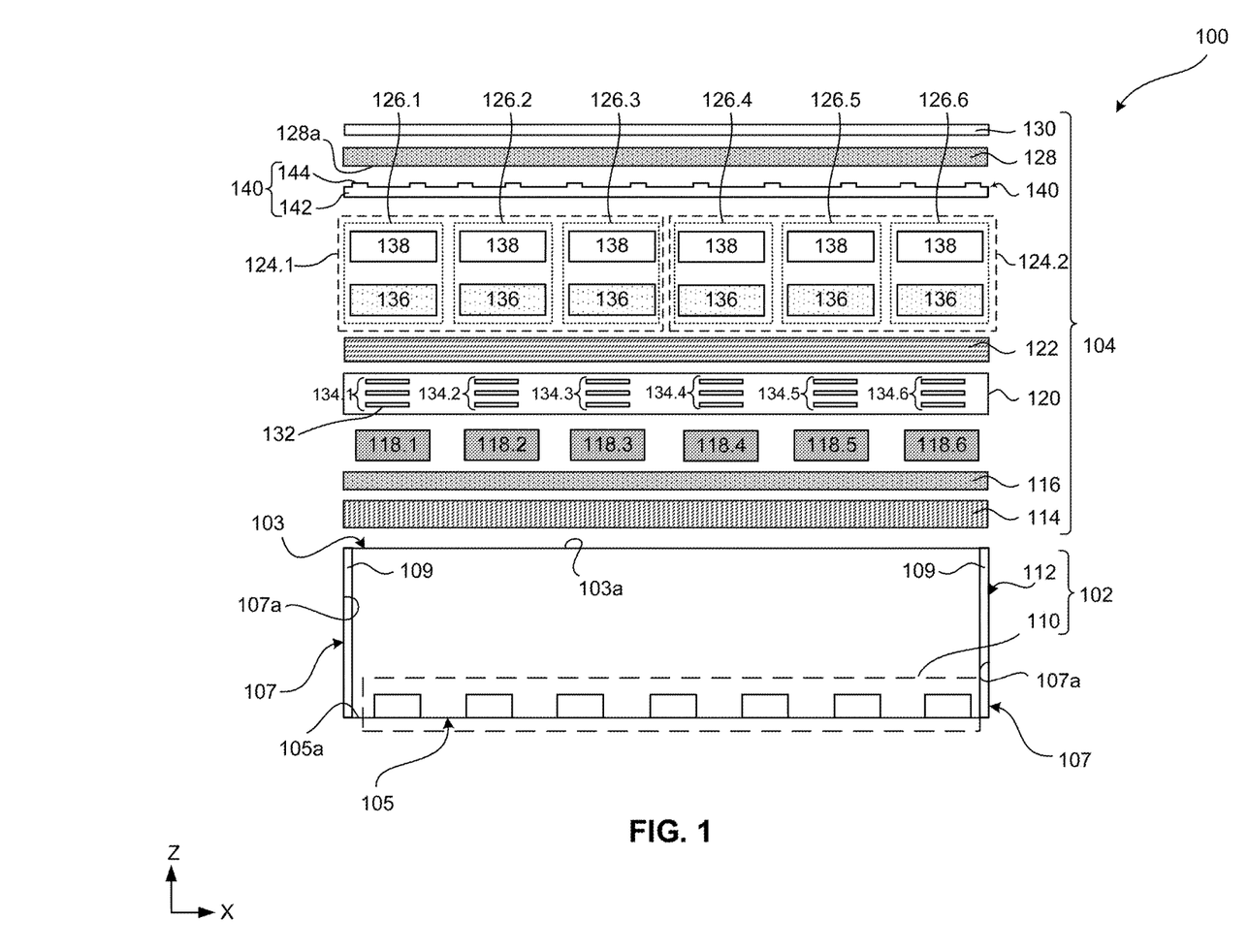
FIGS. 1-2 are exploded cross-sectional views of liquid crystal display (LCD) devices with a light extraction layer, according to some embodiments.

FIG. 1 illustrates a schematic of an exploded cross-sectional view of an LCD display device 100 with a light extraction layer 140, according to some embodiments. The view of display device in FIG. 1 is shown for illustration purposes and may not be drawn to scale. LCD display device 100 can include a backlight unit (BLU) 102 and an LCD module 104, according to some embodiments.

BLU 102 can include an optical cavity 112 and an array of LEDs 110 (e.g., white LEDs, blue LEDs, or a combination thereof) coupled to optical cavity 112. Optical cavity 112 can include a top side 103, a bottom side 105, sidewalls 107, and a closed volume confined by top side 103, bottom side 105, and sidewalls 107. LEDs 110 can be coupled to a top surface 105a of bottom side 105 within the closed volume. LEDs 110 can be configured to provide a primary light (e.g., a blue light, or a white light) that can be processed through LCD module 104 and subsequently, transmitted to and distributed across a display screen 130 of LCD display device 100. In some embodiments, LEDs 110 can comprise blue LEDs that emit in the range from about 440 nm to about 470 nm. In some embodiments, LEDs 110 can comprise white LEDs that emit in the range from about 440 nm to about 700 nm or other possible light wavelength ranges. In some embodiments, the array of LEDs 110 can comprise a two-dimensional array of LEDs that are spread across an area of top surface 105a and the area can be equal to the surface area of display screen 130.

It should be noted that even though two sidewalls 107 are shown in FIG. 1, optical cavity 112 can include any number of sidewalls 107, according to various embodiments. For example, optical cavity 112 can have a cuboid shape and can include four sidewalls similar to sidewalls 107. Optical cavity 112 is not restricted to being cuboid in shape or having other straight-sided shapes. Optical cavity 112 can be configured to be any type of geometric shape, such as but not limited to cylindrical, trapezoidal, spherical, or elliptical, according to various embodiments, without departing from the spirit and scope of the present invention. It should also be noted that the rectangular cross-sectional shape of optical cavity 112, as illustrated in FIG. 1, is for illustrative purposes, and is not limiting. Optical cavity 112 can have other cross-sectional shapes (e.g., trapezoid, oblong, rhomboid), according to various embodiments, without departing from the spirit and scope of the present invention.

Top side 103 of optical cavity 112 can be configured to be an optically diffusive and transmissive layer such that light from LEDs 110 can exit optical cavity 112 through top side 103 with a substantially uniform distribution of brightness across top surface 103a of top side 103. In some embodiments, top side 103 can include optically transparent areas and optically translucent areas that are strategically arranged over LEDs 110 to provide the substantially uniform distribution in light brightness exiting top side 103. In another embodiment, top side 103 can include pores of varying sizes in diameters and optically translucent areas that are strategically arranged to provide the substantially uniform distribution in light brightness exiting top side 103.

Bottom side 105 and/or sidewalls 107 can be constructed from one or more materials (e.g., metals, non-metals, and/or alloys) that are configured to have specularly reflective top surface 105a and/or specularly reflective side wall interior surfaces 107a, respectively. For example, top surface 105a and/or side wall interior surfaces 107a can be mirror-like surfaces having mirror-like reflection properties. In some embodiments, top surface 105a and/or side wall interior surfaces 107a can be completely specularly reflective or partially specularly reflective and partially scattering. In some other embodiments, top surface 105a and/or side wall interior surfaces 107a include diffuse reflectors.

In alternate embodiments, optical cavity 112 can include specular reflectors 109 coupled to sidewall interior surfaces 107a. Specular reflectors 109 can be coupled to sidewall interior surfaces 107a using optically transparent adhesive. The optically transparent adhesive can comprise tape, various glues, polymeric compositions such as silicones, etc. Additional optically transparent adhesive can include various polymers, including, but not limited to, poly(vinyl butyral), poly(vinyl acetate), epoxies, and urethanes; silicone and derivatives of silicone, including, but not limited to, polyphenylmethylsiloxane, polyphenylalkylsiloxane, polydiphenylsiloxane, polydialkylsiloxane, fluorinated silicones and vinyl and hydride substituted silicones; acrylic polymers and copolymers formed from monomers including, but not limited to, methylmethacrylate, butylmethacrylate, and laurylmethacrylate; styrene based polymers; and polymers that are cross linked with difunctional monomers, such as divinylbenzene, according to various examples.

Specularly reflective top surface 105a and side wall interior surfaces 107a and specular reflectors 109 can substantially minimize absorption of light from LEDs 110 through bottom side 105 and/or side walls 107 and thus, substantially minimize loss of luminance within optical cavity 112 and increase light output efficiency of BLU 102.

In alternate embodiments, BLU 102 can further include one or more brightness enhancement films (BEFs) (not shown) disposed between optical cavity 112 and LCD module 104. The one or more BEFs can have reflective and/or refractive films, reflective polarizer films, light extraction features, light recycling features, prism films, groove films, grooved prism films, prisms, pitches, grooves, or other suitable brightness enhancement features. The brightness-enhancing features of BEFs can be configured to reflect a portion of the primary light (e.g., blue light from optical cavity 112) back toward optical cavity 112, thereby providing recycling of the primary light.

LCD module 104 can be configured to process the light received from BLU 102 to desired characteristics for transmission to and distribution across display screen 130. In some embodiments, LCD module 104 can include one or more polarizing filters, such as first and second polarizing filters 114 and 122, one or more optically transparent substrates such as first and second optically transparent substrates 116 and 128, switching devices 118.1 through 118.6 arranged in a 2-D array on first substrate 116, a liquid crystal (LC) solution layer 120, a plurality of pixels such as pixels 124.1-124.2 arranged in a 2-D array, a light extraction layer 140 disposed between pixels 124.1-124.2 and optically transparent substrate 128, and display screen 130.

In some embodiments, pixel 124.1 can include sub-pixels 126.1 through 126.3 and pixel 124.2 can include sub-pixels 126.4 through 126.6. In some embodiments, each of pixels 124.1-124.2 can be tri-chromatic, for example, having red sub-pixels 126.1 and 126.4, green sub-pixels 126.2 and 126.5, and blue sub-pixels 126.3 and 126.6, respectively.

The arrangement order of red, green, and blue sub-pixels 126.1 through 126.6 in respective pixels 124.1-124.2 is illustrative and is not limiting. The red, green, and blue sub-pixels in each of pixels 124.1-124.2 can be arranged in any order with respect to each other. In some embodiments, pixels 124.1 and/or 124.2 can be monochromatic having either red, green, or blue sub-pixels 126.1 through 126.6. The number of pixels and switching devices shown in FIG. 1 are illustrative and are not limiting. LCD module 104 can have any number of switching devices and pixels without departing from the spirit and scope of this disclosure.

Light from BLU 102 can be polarized through first polarizing filter 114 and the polarized light can be transmitted to LC solution layer 120. LC solution layer 120 can include LCs 132 having rod-shaped molecules that can act as shutters to control the amount of light transmission from LC solution layer 120. In some embodiments, LCs 132 can be arranged in a 3-D array. Columns 134.1 through 134.6 of the 3-D array of LCs can be independently controlled by respective switching devices 118.1 through 118.6. In some embodiments, switching devices 118.1 through 118.6 can comprise transistors, such as, for example, thin film transistors (TFTs). By controlling LCs 132, the amount of light travelling from columns 134.1 through 134.6 to respective sub-pixels 126.1 through 126.6 can be controlled, and consequently, the amount of light transmitting from sub-pixels 126.1 through 126.6 is controlled.

LCs 132 can be twisted to varying degrees depending on the voltage applied to columns 134.1 through 134.6 by respective switching devices 118.1 through 118.6. By controlling the twisting of LCs 132, the polarization angle of light passing through LC solution layer 120 can be controlled. Light leaving LC solution layer 120 can then pass through second polarizing filter 122 that can be positioned at 90 degrees with respect to first polarizing filter 114. The angle of polarization of the light leaving LC solution layer 120 and entering second polarizing filter 122 can determine how much of the light is able to pass through and exit from second polarizing filter 122. Second polarizing filter 122 can attenuate the light, block the light, or allow the light to pass without attenuation based on its angle of polarization.

Portions of light travelling through columns 134.1 through 134.6 of LCs and exiting out of second polarizing filter 122 can then enter respective ones of sub-pixels 126.1 through 126.6. These portions of light can undergo a stage of color filtering through the respective ones of sub-pixels 126.1 through 126.6 to achieve the desired optical characteristics for light distribution across display screen 130. In some embodiments, each of sub-pixels 126.1 through 126.6 can include a NS-based CC layer 136 that can filter the portions of light entering sub-pixels 126.1 through 126.6.

NS-based CC layers 136 can include luminescent nanostructures such as QDs (e.g., QD 400 described with reference to FIG. 4), according to some embodiments. NS-based CC layers 136 can be down-converters, where the portions of light (also referred as primary light) entering the respective ones of sub-pixels 126.1 through 126.6 can be absorbed, for example, by the luminescent nanostructures in NS-based CC layers 136 and re-emitted as secondary light having a lower energy or longer wavelength than the primary light.

In some embodiments, NS-based CC layers 136 of red sub-pixels 126.1 and 126.4 can include luminescent nanostructures that absorb the primary light and emit a first secondary light having a primary emission peak wavelength in the red wavelength region of the visible spectrum light. In some embodiments, NS-based CC layers 136 of green sub-pixels 126.2 and 126.5 can include luminescent nanostructures that absorb the primary light and emit a second secondary light having a primary emission peak wavelength in the green wavelength region of the visible spectrum light. In some embodiments, NS-based CC layers 136 of blue sub-pixels 126.3 and 126.6 can include luminescent nanostructures that absorb the primary light and emit a third secondary light having a primary emission peak wavelength in the blue wavelength region of the visible spectrum light.

In alternate embodiments, blue sub-pixels 126.3 and 126.6 can have non-NS-based layers instead of NS-based CC layers 136. The non-NS-based layers can exclude luminescent nanostructures such as QDs and can be optically transmissive to blue light when BLU 102 has blue LEDs 110, as there is no need for down-conversion of primary light from blue LEDs 110 for blue sub-pixels 126.3 and 126.6. In such alternate embodiments, instead of light blocking elements 138, blue sub-pixels 126.3 and 126.6 can also have non-NS-based layers that are optically transmissive to blue light.

In some embodiments, NS-based CC layers 136 can be segmented films that are disposed adjacent to each other on second polarizing filter 122 or on an optically transparent substrate (not shown). The segmented NS-based CC layers 136 can be placed in a manner such that there is negligible gap at interfaces between adjacent NS-based CC layers 136 to prevent leakage of primary light through the interfaces. In alternate embodiments, each of NS-based CC layers 136 can be different regions of a continuous NS-based CC layer.

Optionally, each of sub-pixels 126.1 through 126.6 can include a light blocking element 138 disposed on NS-based CC layer 136, according to some embodiments. The secondary light emitting from NS-based CC layers 136 can be filtered through corresponding ones of light blocking elements 138 before travelling to display screen 130.

Light blocking elements 138 can be configured to allow the secondary light (e.g., first, second, and/or third secondary light discussed above) to pass and to block portions of the primary light (e.g., blue light) that are not absorbed by NS-based CC layers 136 and down-converted to the secondary light. The unwanted portions of primary light that may have leaked out of NS-based CC layers 136 can be blocked by absorbing and/or scattering them. Leakage of the unconverted primary light from NS-based CC layers 136 to display screen 130 can adversely affect the color gamut coverage of LCD display device 100. The use of light blocking elements 138 to prevent such leakage can also help to reduce the manufacturing cost of LCD display device 100 by reducing the density of luminescent nanostructures included in NS-based CC layers 136. The density of luminescent nanostructures can be reduced as instead of using the luminescent nanostructures to absorb substantially all portions of the primary light, any portions of primary light not absorbed in NS-based CC layers 136 can be filtered out by light blocking elements 138.

Light blocking elements 138 can be also configured to tune the spectral emission widths (also referred as width of emission spectrum) of the secondary light (e.g., first, second, and/or third secondary light discussed above) to achieve a desired color gamut coverage of LCD display device 100. Tuning of the spectral emission widths can require absorbing one or more wavelengths from the secondary light to narrow their spectral emission widths to achieve the desired color gamut coverage without significant decrease in brightness. For example, there can be less than 10% (e.g., about 8%, about 5%, about 3%, or about 1%) decrease in brightness due to this tuning process compared to display devices without light blocking elements 138. As the secondary light from NS-based CC layers 136 having luminescent nanostructures such as QDs typically exhibit narrow spectral emission widths, the tuning process may not require absorption of wide range of wavelengths to achieve the desired color gamut coverage as required in non-QD based display devices to achieve similar color gamut coverage.

Light blocking elements 138 can include one or more non-phosphor materials. That is, the one or more non-phosphor materials exhibit optical absorption properties and/or optical scattering properties, but do not exhibit optical emission properties. The one or more non-phosphor materials can be selected based on their optical absorption properties to absorb and/or on their scattering properties to scatter only the one or more wavelengths or range of wavelengths that require absorbing and/or scattering during the above described blocking and tuning processes. In some embodiments, the one or more non-phosphor materials can include the same absorption property. In some embodiment, each of the one or more non-phosphor materials includes an absorption property different from each other.

The one or more non-phosphor materials can be selected such that they can be inexpensively disposed on NS-based CC layers 136 or any other layer/structure (e.g., light extraction layer 140) of LCD display device 100 to form light blocking elements 138. For example, the one or more non-phosphor materials can be dye (e.g., narrow band organic Exciton P491 dye), ink, paint, polymeric material, an/or any material that can be sprayed, painted, spin-coated, printed, or any other suitable low temperature (e.g., below 100° C.) deposition method. Printing can be done using, for example, a plotter, an inkjet printer, or a screen printer. In some embodiments, the one or more non-phosphor materials can be directly disposed on NS-based CC layers 136 or on light extraction layer 140. In some embodiments, the one or more non-phosphor materials can be scattering materials that include films or particles (e.g., particles having diameters ranging from about 100 nm to about 500 µm) of titanium oxide, zinc oxide, zinc sulfide, silicone, or a combination thereof. In some embodiments, light blocking elements 138 can include a substrate having the one or more non-phosphor materials disposed on it.

In some embodiments, light blocking elements 138 can be segmented films that are placed adjacent to each other on NS-based CC layers 136 or on light extraction layer 140. The segmented light blocking elements 138 can be placed in a manner such that there is negligible gap at interfaces between adjacent light blocking elements 138. In alternate embodiments, each of light blocking elements 138 can be different regions of a continuous film placed on NS-based CC layers 136 or on light extraction layer 140.

In some embodiments, light blocking elements 138 may not be a separate structure as shown in FIG. 1, but can be included in NS-based CC layers 136. That is, NS-based CC layers 136 can be a composite film comprising the luminescent nanostructures, as described above, along with light blocking elements 138. The one or more non-phosphor materials of light blocking elements 138 such as dye, ink, paint, polymeric material, scattering materials (e.g., particles having diameters ranging from about 100 nm to about 500 µm), or a combination thereof can be incorporated or embedded in a matrix of NS-based CC layers 136. The one or more non-phosphor materials can include nanostructured materials that can be dispersed in a matrix of NS-based CC layers 136. These nanostructured materials can exhibit optical absorption properties and/or optical scattering properties and may not exhibit any optical emission properties. In some embodiments, light blocking elements 138 can be included in optically transparent substrate 128, which can also be configured to provide environmental sealing to the underlying layers and/or structures of LCD module 104 and/or BLU 102. In alternate embodiments, light blocking elements 138 can be included in second polarizing filter 122, which can be positioned between substrate 128 and NS-based CC layers 136. In some embodiments, light blocking elements 138 can be dichroic filters that, for example, can reflect the primary light (e.g., blue light) while transmitting the secondary light.

In some embodiments, light extraction layer 140 can be disposed on surface 128a of substrate 128. Light extraction layer 140 can include an optically transparent substrate 142 and nanostructured features 144 disposed on substrate 142. In some embodiments, light extraction layer 140 may not include substrate 142 and can have nanostructured features 144 formed directly on surface 128a. Nanostructured features 144 can be formed on substrate 142 or surface 128a using a transfer printing method. In some embodiments, nanostructured features 144 can be arranged in a repeating pattern, a random pattern, or a combination thereof on substrate 142 or surface 128a. In some embodiments, nanostructured features 144 can be arranged to form a corrugated surface on substrate 142 or surface 128a. The corrugated surface can be formed with an array of 1-dimensional (e.g., strip-like), 2-dimensional (e.g., pillar-like), and/or 3-dimensional (e.g., sphere-like) nanostructured features 144. Nanostructured features 144 can have any 3-dimensional geometric shape (e.g., spherical, conical, cylindrical, cuboid, ellipsoidal, or trapezoidal). The lateral dimension of nanostructured features 144 along an X-axis (e.g., width) can be less than about 1 µm or can range from about 10 nm to about 100 nm (e.g., about 10 nm, about 20 nm, about 30 nm, about 40 nm, about 50 nm, or about 60 nm). The vertical dimension of nanostructured features 144 along a Z-axis (e.g., height) can be less than about 1 µm or can range from about 10 nm to about 100 nm (e.g., about 10 nm, about 20 nm, about 30 nm, about 40 nm, about 50 nm, or about 60 nm). The arrangement and shape of nanostructured features 144 in FIG. 1 are illustrative and are not limiting.

Light extraction layer 140 with its nanostructured features 144 can provide a non-uniform interface between substrate 128 and light blocking elements 138 or NS-based CC layers 136 when light blocking elements 138 are optionally absent. The non-uniform interface can substantially reduce or prevent the light generated by NS-based CC layers 136 and/or emitted by light blocking elements 138 from being reflected back into NS-based CC layers 136 due to total internal reflection of the emitted or generated light within respective light blocking elements 138 or NS-based CC layers 136. As a result, light extraction layer 140 with its nanostructured features 144 can significantly increase the amount of light extracted from NS-based CC layers 136 and output from NS-based display device 100 compared to display devices without light extraction layer 140.

In some embodiments, substrate 142 and/or nanostructured features 144 can include a material similar to a matrix material of NS-based CC layers 136 (e.g., matrix material 510 as described in FIG. 5) to provide a better refractive index matching with NS-based CC layers 136 than the refractive index matching between NS-based CC layers 136 and substrate 128. That is because, typically the matrix material of NS-based CC layers 136 has a higher refractive index than substrate 128 and if light in a higher refractive index material (e.g., NS-based CC layers 136) encounters an interface with a lower refractive index material (e.g., substrate 128) at an angle larger than the critical angle, then instead of passing out of the higher refractive index material, the light can be bent back into the higher refractive index material. This can be referred to as total internal reflection. Thus, the better refractive index matching can also substantially reduce or prevent total internal reflection of the emitted or generated light within respective light blocking elements 138 or NS-based CC layers 136.

Display screen 130 can be configured to generate images. Display screen 130 can be a touch screen display, according to some embodiments. LCD display device 100 can further include one or more medium materials (not shown) disposed between any of the adjacent elements in LCD display device 100, for example between optical cavity 112 and LCD module 104, on either sides of LC solution layer 120, or between any other elements of LCD display device 100. The one or more medium materials can include, but not limited to, substrates, a vacuum, air, gas, optical materials, adhesives, optical adhesives, glass, polymers, solids, liquids, gels, cured materials, optical coupling materials, index-matching or index-mismatching materials, index-gradient materials, cladding or anti-cladding materials, spacers, epoxy, silica gel, silicones, brightness-enhancing materials, scattering or diffuser materials, reflective or anti-reflective materials, wavelength-selective materials, wavelength-selective anti-reflective materials, or other suitable medium material. Suitable materials can include silicones, silicone gels, silica gel, epoxies (e.g., Loctite™ Epoxy E-30CL), acrylates (e.g., 3M™ Adhesive 2175). The one or more medium materials can be applied as a curable gel or liquid and cured during or after deposition, or pre-formed and pre-cured prior to deposition. Curing methods can include UV curing, thermal curing, chemical curing, or other suitable curing methods known in the art. Index-matching medium materials can be chosen to minimize optical losses between elements of BLU 102 and LCD module 104.

LCD display device 100 can have a geometric shape, such as but not limited to cylindrical, trapezoidal, spherical, or elliptical, according to various embodiments, without departing from the spirit and scope of the present invention. LCD display device 100 is not restricted to being cuboid in shape or having other straight-sided shapes. It should be noted that the rectangular cross-sectional shape of LCD display device 100 is for illustrative purposes, and is not limiting. LCD display device 100 can have other cross-sectional shapes (e.g., trapezoid, oblong, rhomboid), according to various embodiments, without departing from the spirit and scope of the present invention. It should also be noted that even though optical cavity 112, substrates 116 and 128, polarizing filter 114 and 122, and display screen 130 are shown in FIG. 1 to have similar dimensions along X-axis, a person skilled in the art would understand that each of these components can have dimensions different from each other in one or more directions, according to various embodiments.

Figure 2:
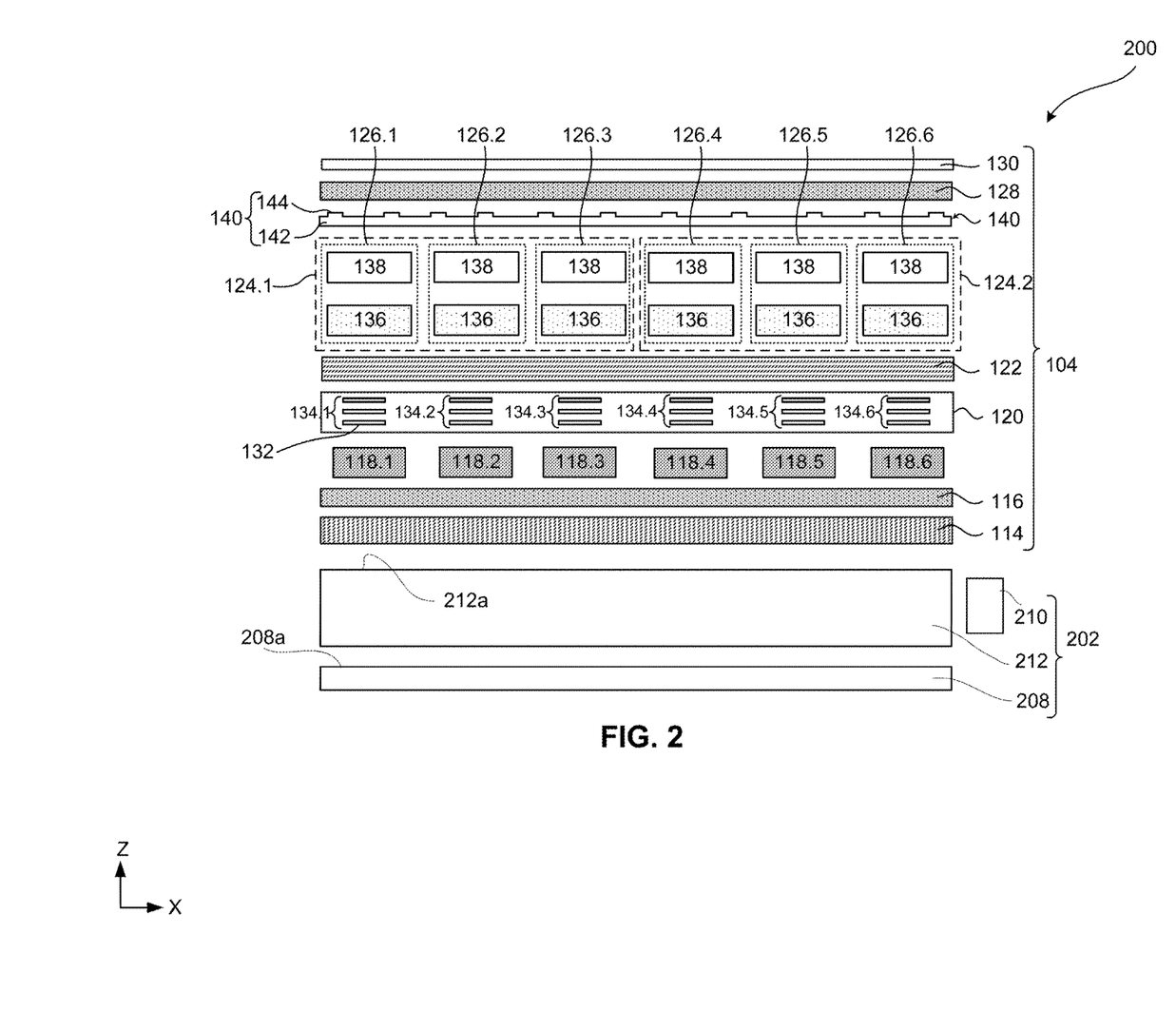

FIG. 2 illustrates a schematic of an exploded cross-sectional view of an edge-lit LCD display device 200 with a light extraction layer 140, according to some embodiments. LCD display device 200 can include a BLU 202 and LCD module 104. Elements in FIG. 2 with the same annotations as elements in FIG. 1 are described above.

BLU 202 can include an LED 210 (e.g., a blue LED), a light guide plate (LGP) 212, and a reflector 208. BLU 202 can be configured to provide a primary light (e.g., a blue light) that can be processed through LCD module 104 and subsequently, transmitted to and distributed across display screen 130. The blue LED can emit in the range from about 440 nm to about 470 nm. According to some embodiments, the blue LED can be, for example, a GaN LED that emits blue light at a wavelength of 450 nm.

LGP 212 can include fiber optic cables, polymeric or glass solid bodies such as plates, films, containers, or other structures, according to some embodiments. The size of LGP 212 can depend on the ultimate application and characteristics of LED 210. The thickness of LGP 212 can be compatible with thickness of LED 210. The other dimensions of LGP 212 can be designed to extend beyond the dimensions of LED 210, and can be on the order of 10's of millimeters, to 10's to 100's of centimeters.

In some embodiments, the materials of LGP 212 can include polycarbonate (PC), poly methyl methacrylate (PMMA), methyl methacrylate, styrene, acrylic polymer resin, glass, or other suitable LGP materials. Suitable manufacturing methods for LGP 212 can include injection molding, extrusion, or other suitable embodiments. LGP 212 can be configured to provide uniform primary light emission, such that primary light entering LCD module 104 can be of uniform color and brightness. LGP 212 can include a substantially uniform thickness over the entire LGP 212 surface. Alternatively, LGP 212 can have a wedge-like shape. In some embodiments, LGP 212 can be optically coupled to LED 210 and can be physically connected to or detached from LED 210. For physically connecting LGP 212 to LED 210, optically transparent adhesive can be used (not shown).

In some embodiments, BLU 202 can include an array of LEDs (not shown), each of which can be similar to LED 210 in structure and function. The array of LEDs can be adjacent to LGP 212 and can be configured to provide the primary light to LCD module 104 for processing and for subsequent transmission to display screen 130 as discussed above with reference to FIG. 1.

In some embodiments, reflector 208 can be configured to increase the amount of light that is emitted from LGP 212. Reflector 208 can comprise a suitable material, such as a reflective mirror, a film of reflector particles, a reflective metal film, or other suitable conventional reflectors. In some embodiments, reflector 208 can include a white film. In some embodiments, reflector 208 can include additional functionality or features, such as scattering, diffuser, or brightness-enhancing features.

Example Methods for Fabricating a Display Device

Figure 3:
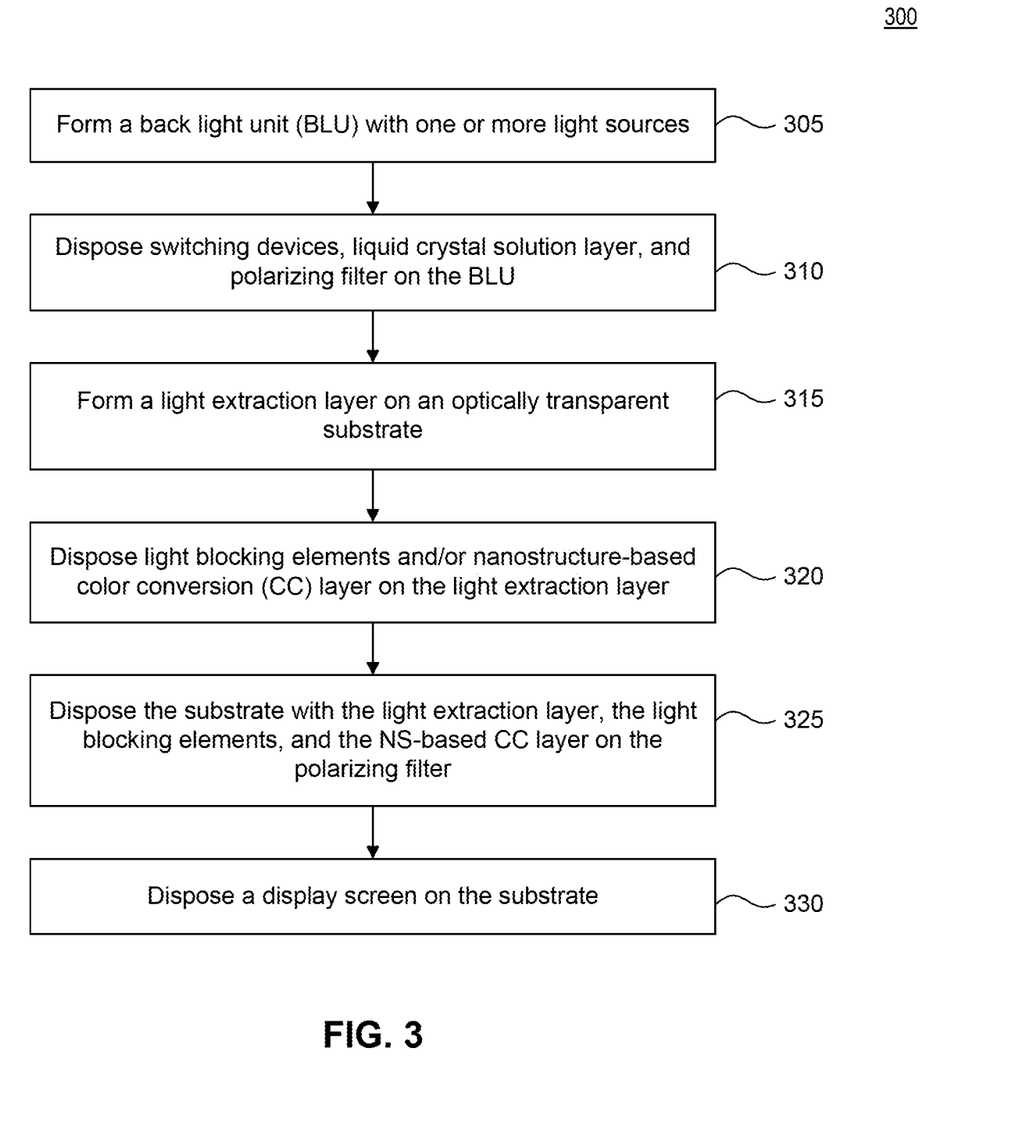
FIG. 3 is a flow diagram of a method for fabricating an LCD device with a light extraction layer, according to some embodiments.

FIG. 3 is a flow diagram of an example method 300 for fabricating display devices 100 and/or 200, according to some embodiments. Steps can be performed in a different order or not performed depending on specific applications. It should be noted that method 300 may not produce a complete display device. Accordingly, it is understood that additional processes can be provided before, during, and after method 300, and that some other processes may only be briefly described herein.

In step 305, a BLU with one or more light sources is formed. For example, as described with reference to FIGS. 1-2, BLU 102 can be formed with optical cavity 112 and array of LEDs 110 (e.g., white LEDs, blue LEDs, or a combination thereof) coupled to optical cavity 112 or BLU 202 can be formed with LGP 212 and LED 210 (e.g., a blue LED).

In step 310, switching devices, LC solution layer, and polarizing filter are disposed on the BLU. For example, as described with reference to FIGS. 1-2, switching devices 118.1 through 118.6 arranged in a 2-D array can be disposed optically transparent substrate 116, which is disposed on BLU 102 or 202, LC solution layer 120 can be disposed on switching devices 118.1 through 118.6, and polarizing filter 122 can be disposed on LC solution layer 120.

In step 315, a light extraction layer is formed on an optically transparent substrate. For example, as described with reference to FIGS. 1-2, light extraction layer 140 including substrate 142 and nanostructured features 144 can be formed on substrate 128. In some embodiments, nanostructured features 144 of light extraction layer 140 can be formed directly on substrate 128. Nanostructured features 144 can be formed using a transfer printing method.

In step 320, light blocking elements and/or NS-based CC layers are formed on the light extraction layer. For example, as described with reference to FIGS. 1-2, light blocking elements 138 can be disposed on light extraction layer 140 by spraying, painting, spin-coating, printing, or any other suitable low temperature (e.g., below 100° C.) deposition method. Printing can be done using, for example, a plotter, an inkjet printer, or a screen printer. NS-based CC layers 136 can be disposed on light blocking elements 138 by a suitable deposition method (e.g., method described for forming NS film in FIG. 5). In some embodiments, NS-based CC layers 136 can be disposed directly on light extraction layer 140 when light blocking elements 138 are optionally absent.

In step 325, the substrate with the light extraction layer 140, the light blocking elements, and the NS-based CC layers are disposed on the polarizing filter. For example, as described with reference to FIGS. 1-2, substrate 128 with light extraction layer 140, light blocking elements 138, and NS-based CC layers 136 can be disposed on polarizing filter 122 with NS-based layers 136 facing and in contact with polarizing filter 122.

In step 330, a display screen is disposed on the substrate. For example, as described with reference to FIGS. 1-2, display screen 130 can be disposed on a surface of substrate 128 that is opposite to surface 128a having light extraction layer 140.

Example Embodiments of a Barrier Layer Coated Nano Structure

Figure 4:
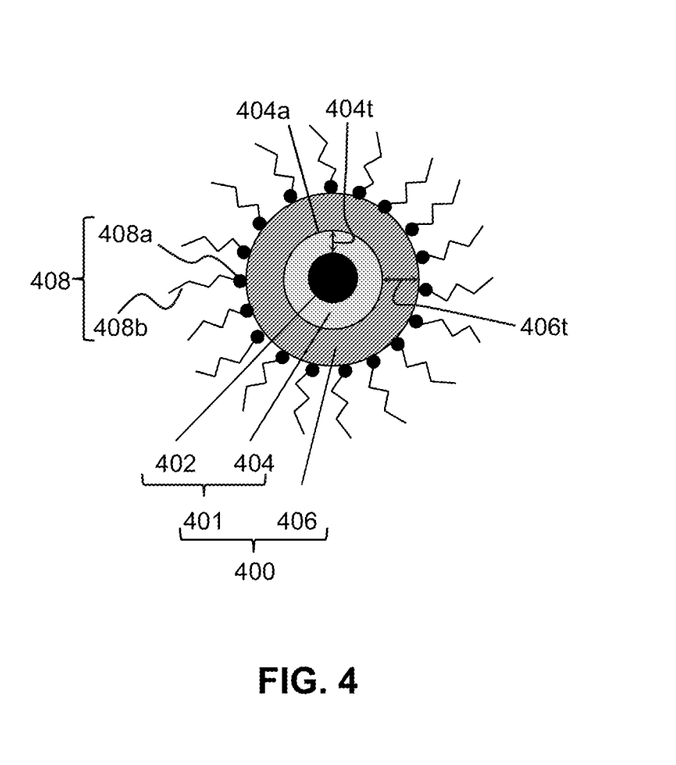
FIG. 4 is a schematic of a cross-sectional view of a nanostructure, according to some embodiments.

FIG. 4 illustrates a cross-sectional structure of a barrier layer coated luminescent nanostructure (NS) 400, according to some embodiments. In some embodiments, a population of NS 400 can be included in NS-based CC layer 136. Barrier layer coated NS 400 includes a NS 401 and a barrier layer 406. NS 401 includes a core 402 and a shell 404. Core 402 includes a semiconducting material that emits light upon absorption of higher energies. Examples of the semiconducting material for core 402 include indium phosphide (InP), cadmium selenide (CdSe), zinc sulfide (ZnS), lead sulfide (PbS), indium arsenide (InAs), indium gallium phosphide, (InGaP), cadmium zinc selenide (CdZnSe), zinc selenide (ZnSe) and cadmium telluride (CdTe). Any other II-VI, III-V, tertiary, or quaternary semiconductor structures that exhibit a direct band gap can be used as well. In some embodiments, core 402 can also include one or more dopants such as metals, alloys, to provide some examples. Examples of metal dopant can include, but not limited to, zinc (Zn), Copper (Cu), aluminum (Al), platinum (Pt), chrome (Cr), tungsten (W), palladium (Pd), or a combination thereof. The presence of one or more dopants in core 402 can improve structural and optical stability and QY of NS 401 compared to undoped NSs.

Core 402 can have a size of less than 20 nm in diameter, according to some embodiments. In another embodiment, core 402 can have a size between about 1 nm and about 5 nm in diameter. The ability to tailor the size of core 402, and consequently the size of NS 401 in the nanometer range enables photoemission coverage in the entire optical spectrum. In general, the larger NSs emit light towards the red end of the spectrum, while smaller NSs emit light towards the blue end of the spectrum. This effect arises as larger NSs have energy levels that are more closely spaced than the smaller NSs. This allows the NS to absorb photons containing less energy, i.e. those closer to the red end of the spectrum.

Shell 404 surrounds core 402 and is disposed on outer surface of core 402. Shell 404 can include cadmium sulfide (CdS), zinc cadmium sulfide (ZnCdS), zinc selenide sulfide (ZnSeS), and zinc sulfide (ZnS). In some embodiments, shell 404 can have a thickness 404t, for example, one or more monolayers. In other embodiments, shell 404 can have a thickness 404t between about 1 nm and about 5 nm. Shell 404 can be utilized to help reduce the lattice mismatch with core 402 and improve the QY of NS 401. Shell 404 can also help to passivate and remove surface trap states, such as dangling bonds, on core 402 to increase QY of NS 401. The presence of surface trap states can provide non-radiative recombination centers and contribute to lowered emission efficiency of NS 401.

In alternate embodiments, NS 401 can include a second shell disposed on shell 404, or more than two shells surrounding core 402, without departing from the spirit and scope of the present invention. In some embodiments, the second shell can be on the order of two monolayers thick and is typically, though not required, also a semiconducting material. Second shell can provide protection to core 402. Second shell material can be zinc sulfide (ZnS), although other materials can be used as well without deviating from the scope or spirit of the invention.

Barrier layer 406 is configured to form a coating on NS 401. In some embodiments, barrier layer 406 is disposed on and in substantial contact with outer surface 404a of shell 404. In embodiments of NS 401 having one or more shells, barrier layer 406 can be disposed on and in substantial contact with the outermost shell of NS 401. In an example embodiment, barrier layer 406 is configured to act as a spacer between NS 401 and one or more NSs in, for example, a solution, a composition, and/or a film having a plurality of NSs, where the plurality of NSs can be similar to NS 401 and/or barrier layer coated NS 400. In such NS solutions, NS compositions, and/or NS films, barrier layer 406 can help to prevent aggregation of NS 401 with adjacent NSs. Aggregation of NS 401 with adjacent NSs can lead to increase in size of NS 401 and consequent reduction or quenching in the optical emission properties of the aggregated NS (not shown) including NS 401. In further embodiments, barrier layer 406 provides protection to NS 401 from, for example, moisture, air, and/or harsh environments (e.g., high temperatures and chemicals used during lithographic processing of NSs and/or during manufacturing process of NS based devices) that can adversely affect the structural and optical properties of NS 401.

Barrier layer 406 includes one or more materials that are amorphous, optically transparent and/or electrically inactive. Suitable barrier layers include inorganic materials, such as, but not limited to, inorganic oxides and/or nitrides. Examples of materials for barrier layer 406 include oxides and/or nitrides of Al, Ba, Ca, Mg, Ni, Si, Ti, or Zr, according to various embodiments. Barrier layer 406 can have a thickness 406t ranging from about 8 nm to about 15 nm in various embodiments.

As illustrated in FIG. 4, barrier layer coated NS 400 can additionally or optionally include a plurality of ligands or surfactants 408, according to some embodiments. Ligands or surfactants 408 can be adsorbed or bound to an outer surface of barrier layer coated NS 400, such as on an outer surface of barrier layer 406, according to some embodiments. The plurality of ligands or surfactants 408 can include hydrophilic or polar heads 408a and hydrophobic or non-polar tails 408b. The hydrophilic or polar heads 408a can be bound to barrier layer 406. The presence of ligands or surfactants 408 can help to separate NS 400 and/or NS 401 from other NSs in, for example, a solution, a composition, and/or a film during their formation. If the NSs are allowed to aggregate during their formation, the quantum efficiency of NSs such as NS 400 and/or NS 401 can drop. Ligands or surfactants 408 can also be used to impart certain properties to barrier layer coated NS 400, such as hydrophobicity to provide miscibility in non-polar solvents, or to provide reaction sites (e.g., reverse micellar systems) for other compounds to bind.

A wide variety of ligands exist that can be used as ligands 408. In some embodiments, the ligand is a fatty acid selected from lauric acid, caproic acid, myristic acid, palmitic acid, stearic acid, and oleic acid. In some embodiments, the ligand is an organic phosphine or an organic phosphine oxide selected from trioctylphosphine oxide (TOPO), trioctylphosphine (TOP), diphenylphosphine (DPP), triphenylphosphine oxide, and tributylphosphine oxide. In some embodiments, the ligand is an amine selected from dodecylamine, oleylamine, hexadecylamine, and octadecylamine. In some embodiments, the ligand is trioctylphosphine (TOP). In some embodiments, the ligand is oleylamine. In some embodiments, the ligand is diphenylphosphine.

A wide variety of surfactants exist that can be used as surfactants 408. Nonionic surfactants can be used as surfactants 408 in some embodiments. Some examples of nonionic surfactants include polyoxyethylene (5) nonylphenylether (commercial name IGEPAL CO-520), polyoxyethylene (9) nonylphenylether (IGEPAL CO-630), octylphenoxy poly (ethyleneoxy)ethanol (IGEPAL CA-630), polyethylene glycol oleyl ether (Brij 93), polyethylene glycol hexadecyl ether (Brij 52), polyethylene glycol octadecyl ether (Brij S10), polyoxyethylene (10) isooctylcyclohexyl ether (Triton X-100), and polyoxyethylene branched nonylcyclohexyl ether (Triton N-101).

Anionic surfactants can be used as surfactants 408 in some embodiments. Some examples of anionic surfactants include sodium dioctyl sulfosuccinate, sodium stearate, sodium lauryl sulfate, sodium monododecyl phosphate, sodium dodecylbenzenesulfonate, and sodium myristyl sulfate.

In some embodiments, NSs 401 and/or 400 can be synthesized to emit light in one or more various color ranges, such as red, orange, and/or yellow range. In some embodiments, NSs 401 and/or 400 can be synthesized to emit light in the green and/or yellow range. In some embodiments, NSs 401 and/or 400 can be synthesized emit light in the blue, indigo, violet, and/or ultra-violet range. In some embodiments, NSs 401 and/or 400 can be synthesized to have a primary emission peak wavelength between about 605 nm and about 650 nm, between about 510 nm and about 550 nm, or between about 300 nm and about 480 nm.

NSs 401 and/or 400 can be synthesized to display a high QY. In some embodiments, NSs 401 and/or 400 can be synthesized to display a QY between 80% and 95% or between 85% and 90%.

Thus, according to various embodiments, NSs 400 can be synthesized such that the presence of barrier layer 406 on NSs 401 does not substantially change or quench the optical emission properties of NSs 401.

Example Embodiments of a Nano Structure Film

Figure 5:
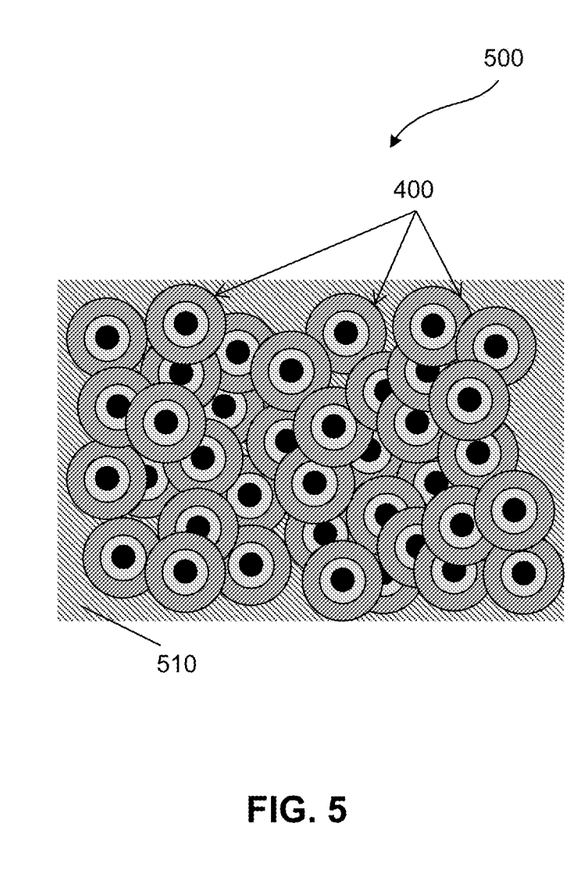
FIG. 5 is a schematic of a nanostructure film, according to some embodiments.

FIG. 5 illustrates a cross-sectional view of a NS film 500, according to some embodiments. In some embodiments, NS-based CC layer 136 can be similar to NS film 500.

NS film 500 can include a plurality of barrier layer coated core-shell NSs 400 (FIG. 4) and a matrix material 510, according to some embodiments. NSs 400 can be embedded or otherwise disposed in matrix material 510, according to some embodiments. As used herein, the term "embedded" is used to indicate that the NSs are enclosed or encased within matrix material 510 that makes up the majority component of the matrix. It should be noted that NSs 400 can be uniformly distributed throughout matrix material 510 in some embodiments, though in other embodiments NSs 400 can be distributed according to an application-specific uniformity distribution function. It should be noted that even though NSs 400 are shown to have the same size in diameter, a person skilled in the art would understand that NSs 400 can have a size distribution.

In some embodiments, NSs 400 can include a homogenous population of NSs having sizes that emit in the blue visible wavelength spectrum, in the green visible wavelength spectrum, or in the red visible wavelength spectrum. In other embodiments, NSs 400 can include a first population of NSs having sizes that emit in the blue visible wavelength spectrum, a second population of NSs having sizes that emit in the green visible wavelength spectrum, and a third population of NSs that emit in the red visible wavelength spectrum.

Matrix material 510 can be any suitable host matrix material capable of housing NSs 400. Suitable matrix materials can be chemically and optically compatible with NSs 400 and any surrounding packaging materials or layers used in applying NS film 500 to devices. Suitable matrix materials can include non-yellowing optical materials which are transparent to both the primary and secondary light, thereby allowing for both primary and secondary light to transmit through the matrix material. In some embodiments, matrix material 510 can completely surround each of the NSs 400. The matrix material 510 can be flexible in applications where a flexible or moldable NS film 500 is desired. Alternatively, matrix material 510 can include a high-strength, non-flexible material.

Matrix material 510 can include polymers and organic and inorganic oxides. Suitable polymers for use in matrix material 510 can be any polymer known to the ordinarily skilled artisan that can be used for such a purpose. The polymer can be substantially translucent or substantially transparent. Matrix material 510 can include, but not limited to, epoxies, acrylates, norbornene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with bifunctional monomers, such as divinylbenzene; cross-linkers suitable for cross-linking ligand materials, epoxides which combine with ligand amines (e.g., APS or PEI ligand amines) to form epoxy, and the like.

In some embodiments, matrix material 510 includes scattering microbeads such as $TiO_2$ microbeads, ZnS microbeads, or glass microbeads that can improve photo conversion efficiency of NS film 500. In some embodiments, matrix material 510 can include light blocking elements such as light blocking elements 138 described above with reference to FIGS. 1-2.

In another embodiment, matrix material 510 can have low oxygen and moisture permeability, exhibit high photo- and chemical-stability, exhibit favorable refractive indices, and adhere to outer surfaces of NSs 400, thus providing an air-tight seal to protect NSs 400. In another embodiment, matrix material 510 can be curable with UV or thermal curing methods to facilitate roll-to-roll processing.

According to some embodiments, NS film 500 can be formed by mixing NSs 400 in a polymer (e.g., photoresist) and casting the NS-polymer mixture on a substrate, mixing NSs 400 with monomers and polymerizing them together, mixing NSs 400 in a sol-gel to form an oxide, or any other method known to those skilled in the art.

According to some embodiments, the formation of NS film 500 can include a film extrusion process. The film extrusion process can include forming a homogenous mixture of matrix material 510 and barrier layer coated core-shell NSs such as NS 400, introducing the homogenous mixture into a top mounted hopper that feeds into an extruder. In some embodiments, the homogenous mixture can be in the form of pellets. The film extrusion process can further include extruding NS film 500 from a slot die and passing extruded NS film 500 through chill rolls. In some embodiments, the extruded NS film 500 can have a thickness less than about 75 μm, for example, in a range from about 70 μm to about 40 μm, from about 65 μm to about 40 μm, from about 60 μm to about 40 μm, or form about 50 μm to about 40 μm. In some embodiments, NS film 500 has a thickness less than 10 μm. In some embodiments, the formation of NS film 500 can optionally include a secondary process followed by the film extrusion process. The secondary process can include a process such as co-extrusion, thermoforming, vacuum forming, plasma treatment, molding, and/or embossing to provide a texture to a top surface of NS film 500. The textured top surface NS film 500 can help to improve, for example defined optical diffusion property and/or defined angular optical emission property of NS film 500.

Example Embodiments of Luminescent Nanostructures

Described herein are various compositions having luminescent nanostructures (NSs). The various properties of the luminescent nanostructures, including their absorption properties, emission properties and refractive index properties, can be tailored and adjusted for various applications.

The material properties of NSs can be substantially homogenous, or in certain embodiments, can be heterogeneous. The optical properties of NSs can be determined by their particle size, chemical or surface composition. The ability to tailor the luminescent NS size in the range between about 1 nm and about 15 nm can enable photoemission coverage in the entire optical spectrum to offer great versatility in color rendering. Particle encapsulation can offer robustness against chemical and UV deteriorating agents.

Luminescent NSs, for use in embodiments described herein can be produced using any method known to those skilled in the art. Suitable methods and example nanocrystals are disclosed in U.S. Pat. No. 7,374,807; U.S. patent application Ser. No. 10/796,832, filed Mar. 10, 2004; U.S. Pat. No. 6,949,206; and U.S. Provisional Patent Application No. 60/578,236, filed Jun. 8, 2004, the disclosures of each of which are incorporated by reference herein in their entireties.

Luminescent NSs for use in embodiments described herein can be produced from any suitable material, including an inorganic material, and more suitably an inorganic conductive or semiconductive material. Suitable semiconductor materials can include those disclosed in U.S. patent application Ser. No. 10/796,832, and can include any type of semiconductor, including group II-VI, group III-V, group IV-VI and group IV semiconductors. Suitable semiconductor materials can include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SuS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and an appropriate combination of two or more such semiconductors.

In certain embodiments, the luminescent NSs can have a dopant from the group consisting of a p-type dopant or an n-type dopant. The NSs can also have II-VI or III-V semiconductors. Examples of II-VI or III-V semiconductor NSs can include any combination of an element from Group II, such as Zn, Cd and Hg, with any element from Group VI, such as S, Se, Te and Po, of the Periodic Table; and any combination of an element from Group III, such as B, Al, Ga, In, and Tl, with any element from Group V, such as N, P, As, Sb and Bi, of the Periodic Table.

The luminescent NSs, described herein can also further include ligands conjugated, cooperated, associated or attached to their surface. Suitable ligands can include any group known to those skilled in the art, including those disclosed in U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosures of each of which are incorporated herein by reference. Use of such ligands can enhance the ability of the luminescent NSs to incorporate into various solvents and matrixes, including polymers. Increasing the miscibility (i.e., the ability to be mixed without separation) of the luminescent NSs in various solvents and matrixes can allow them to be distributed throughout a polymeric composition such that the NSs do not aggregate together and therefore do not scatter light. Such ligands are described as "miscibility-enhancing" ligands herein.

In certain embodiments, compositions having luminescent NSs distributed or embedded in a matrix material are provided. Suitable matrix materials can be any material known to the ordinarily skilled artisan, including polymetic materials, organic and inorganic oxides. Compositions described herein can be layers, encapsulants, coatings, sheets or films. It should be understood that in embodiments described herein where reference is made to a layer, polymeric layer, matrix, sheet or film, these terms are used interchangeably, and the embodiment so described is not limited to any one type of composition, but encompasses any matrix material or layer described herein or known in the art.

Down-converting NSs (for example, as disclosed in U.S. Pat. No. 7,374,807) utilize the emission properties of luminescent nanostructures that are tailored to absorb light of a particular wavelength and then emit at a second wavelength, thereby providing enhanced performance and efficiency of active sources (e.g., LEDs).

While any method known to the ordinarily skilled artisan can be used to create luminescent NSs, a solution-phase colloidal method for controlled growth of inorganic nanomaterial phosphors can be used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," *J Am. Chem. Soc.* 115:8706 (1993), the disclosures of which are incorporated by reference herein in their entireties.

According to some embodiments, CdSe can be used as the NS material, in one example, for visible light down-conversion, due to the relative maturity of the synthesis of this material. Due to the use of a generic surface chemistry, it can also possible to substitute non-cadmium-containing NSs.

In semiconductor NSs, photo-induced emission arises from the band edge states of the NS. The band-edge emission from luminescent NSs competes with radiative and non-radiative decay channels originating from surface electronic states. X. Peng, et al., *J Am. Chem. Soc.* 30:7019-7029 (1997). As a result, the presence of surface defects such as dangling bonds provide non-radiative recombination centers and contribute to lowered emission efficiency. An efficient and permanent method to passivate and remove the surface trap states can be to epitaxially grow an inorganic shell material on the surface of the NS. X. Peng, et al., *J. Am. Chem. Soc.* 30:701 9-7029 (1997). The shell material can be chosen such that the electronic levels are type 1 with respect to the core material (e.g., with a larger bandgap to provide a potential step localizing the electron and hole to the core). As a result, the probability of non-radiative recombination can be reduced.

Core-shell structures can be obtained by adding organometallic precursors containing the shell materials to a reaction mixture containing the core NSs. In this case, rather than a nucleation event followed by growth, the cores act as the nuclei, and the shells can grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and to ensure solubility. A uniform and epitaxially grown shell can be obtained when there is a low lattice mismatch between the two materials.

Example materials for preparing core-shell luminescent NSs can include, but are not limited to, Si, Ge, Sn, Se, Te, B, C (including diamond), P, Co, Au, BN, BP, BAs, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTc, BeS, BcSe, BcTe, MgS, MgSe, GeS, GeSe, GeTe, SnS, SnSe, SnTe, PbO, PbS, Pb Se, PbTe, CuP, CuCl, CuBr, CuI, $Si_3N_4$, $Ge_3N_4$, $Al_2O_3$, $(Al, Ga, In)_2 (S, Se, Te)_3$, AlCO, and shell luminescent NSs for use in the practice of the present invention include, but are not limited to, (represented as Core/Shell), CdSe/ZnS, InP/ZnS, InP/ZnSe, PbSe/PbS, CdSe/CdS, CdTe/CdS, CdTe/ZnS, as well as others.

Luminescent NSs for use in the embodiments described herein can be less than about 100 nm in size, and down to less than about 2 nm in size and invention absorb visible light. As used herein, visible light is electromagnetic radiation with wavelengths between about 380 and about 780 nanometers that is visible to the human eye. Visible light can be separated into the various colors of the spectrum, such as red, orange, yellow, green, blue, indigo and violet. Blue light can comprise light between about 435 nm and about 495 nm, green light can comprise light between about 495 nm and 570 nm and red light can comprise light between about 620 nm and about 750 nm in wavelength.

According to various embodiments, the luminescent NSs can have a size and a composition such that they absorb photons that are in the ultraviolet, near-infrared, and/or infrared spectra. The ultraviolet spectrum can comprise light between about 100 nm to about 400 nm, the near-infrared spectrum can comprise light between about 750 nm to about 100 μm in wavelength, and the infrared spectrum can comprise light between about 750 nm to about 300 μm in wavelength.

While luminescent NSs of other suitable material can be used in the various embodiments described herein, in certain embodiments, the NSs can be ZnS, InAs, CdSe, or any combination thereof to form a population of nanocrystals for use in the embodiments described herein. As discussed above, in further embodiments, the luminescent NSs can be core/shell nanocrystals, such as CdSe/ZnS, InP/ZnSe, CdSe/CdS or InP/ZnS.

Suitable luminescent nanostructures, methods of preparing luminescent nanostructures, including the addition of various solubility-enhancing ligands, can be found in Published U.S. Patent Publication No. 2012/0113672, the disclosure of which is incorporated by reference herein in its entirety.

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments can be practiced otherwise than as specifically described.

What is claimed is:

1. A display device comprising:
   a backlight unit comprising a light source; and
   a liquid crystal display (LCD) module comprising:
   a nanostructure-based color conversion (NS-based CC) layer configured to receive a primary light from the light source, having a first peak wavelength and to convert a portion of the primary light to emit a first portion of a secondary light having a second peak wavelength that is different from the first peak wavelength; and
   a light extraction layer, optically coupled to the NS-based CC layer, configured to prevent total internal reflection of a second portion of the secondary light, wherein the light extraction layer comprises an optically transparent substrate and patterned features with one or more dimension in nanometer scale disposed on the optically transparent substrate, wherein the patterned features are arranged in a repeating pattern or a random pattern on the optically transparent substrate, wherein the optically transparent substrate is disposed between the NS-based CC layer and the patterned features, and wherein top surfaces of the patterned features face away from a top surface of the NS-based CC layer.

2. The display device of claim 1, wherein the patterned features and a matrix of the NS-based CC layer include a same material.

3. The display device of claim 1, wherein refractive indices of a material of the patterned features and a matrix material of the NS-based CC layer are equal to each other.

4. The display device of claim 1, wherein the patterned features have a lateral dimension ranging from about 10 nm to about 100 nm and a vertical dimension ranging from about 10 nm to about 100 nm.

5. The display device of claim 1, wherein the light extraction layer forms a non-uniform interface between the NS-based CC layer and a second optically transparent substrate through which the first and second portions of the secondary light is emitted.

6. The display device of claim 1, further comprising a filter element, optically coupled to the NS-based CC layer and the light extraction layer, configured to allow the first and second portions of the secondary light to pass through the filter element and to block an unconverted portion of the primary light from passing through the filter element.

7. The display device of claim 1, wherein:
the NS-based CC layer comprises a matrix; and
the filter element is embedded in the matrix.

8. The display device of claim 1, wherein the NS-based CC layer comprises luminescent nanostructures.

9. The display device of claim 1, wherein the NS-based CC layer comprises an array of segmented NS-based CC layers.

10. The display device of claim 1, wherein the NS-based CC layer comprises:
a first region having a first population of luminescent nanostructures configured to emit red light; and
a second region having a second population of luminescent nanostructures configured to emit green light.

11. The display device of claim 1, wherein the NS-based CC layer comprises:
a first region having a first population of luminescent nanostructures configured to emit red light;
a second region having a second population of luminescent nanostructures configured to emit green light; and
a third region having a third population of luminescent nanostructures configured to emit blue light.

12. The display device of claim 1, wherein the light extraction layer is disposed over a plurality of sub-pixels.

13. A method of fabricating a display device, the method comprising:
forming first and second parts of a liquid crystal display (LCD) module,
wherein the forming the first part comprises:
disposing a liquid crystal solution layer on a back light unit (BLU) of the display device, and
disposing a polarizing filter on the liquid crystal solution layer, and
wherein the forming the second part comprises:
forming a light extraction layer on an optically transparent substrate by patterning or transfer printing nanostructured features on the optically transparent substrate, and
forming a nanostructure-based color conversion (NS-based CC) layer on the light extraction layer, wherein the optically transparent substrate is disposed between the NS-based CC layer and the nanostructured features, and wherein top surfaces of the patterned features face away from a top surface of the NS-based CC layer;
disposing the second part of the LCD module on the first part of the LCD module; and
disposing a display screen on the second part of the LCD module.

14. The method of claim 13, wherein the forming the light extraction layer comprises transfer printing the nanostructured features in a repeating pattern or a random pattern on the optically transparent substrate.

15. The method of claim 13, wherein the forming the light extraction layer comprises patterning nanostructured features with a material having a refractive index equal to a refractive index of a matrix material of the NS-based CC layer, a lateral dimension ranging from about 10 nm to about 100 nm, and a vertical dimension ranging from about 10 nm to about 100 nm.

16. The display device of claim 13, wherein the forming the NS-based CC layer comprises:
disposing a light blocking element on the light extraction layer; and
disposing the NS-based CC layer on the light blocking element.

17. The display device of claim 13, wherein the forming the NS-based CC layer comprises disposing the NS-based CC layer directly on the light extraction layer.

18. The display device of claim 13, wherein the disposing the second part of the LCD module on the first part of the LCD module comprises coupling the NS-based CC layer with the polarizing filter.

19. The method of claim 13, wherein forming the light extraction layer comprises forming the light extraction layer over a plurality of sub-pixels.

* * * * *